E. A. SPERRY.
SIGNALING APPARATUS FOR DETECTING SUBMARINES.
APPLICATION FILED JULY 9, 1917.
1,426,337.
Patented Aug. 15, 1922.
4 SHEETS—SHEET 4.
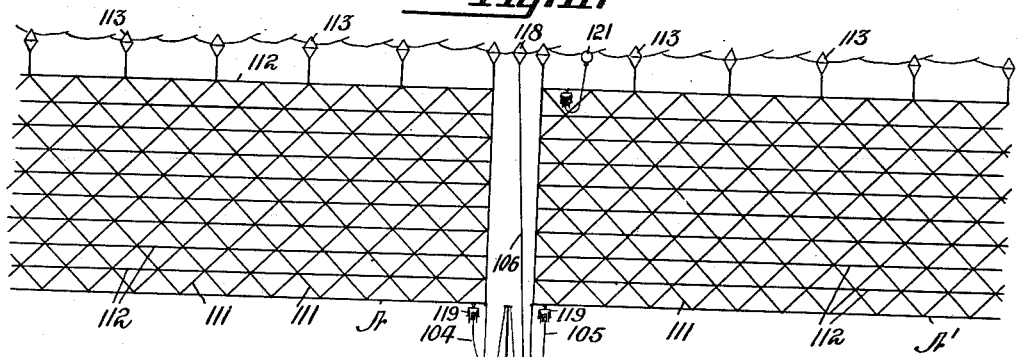
Fig. 11.
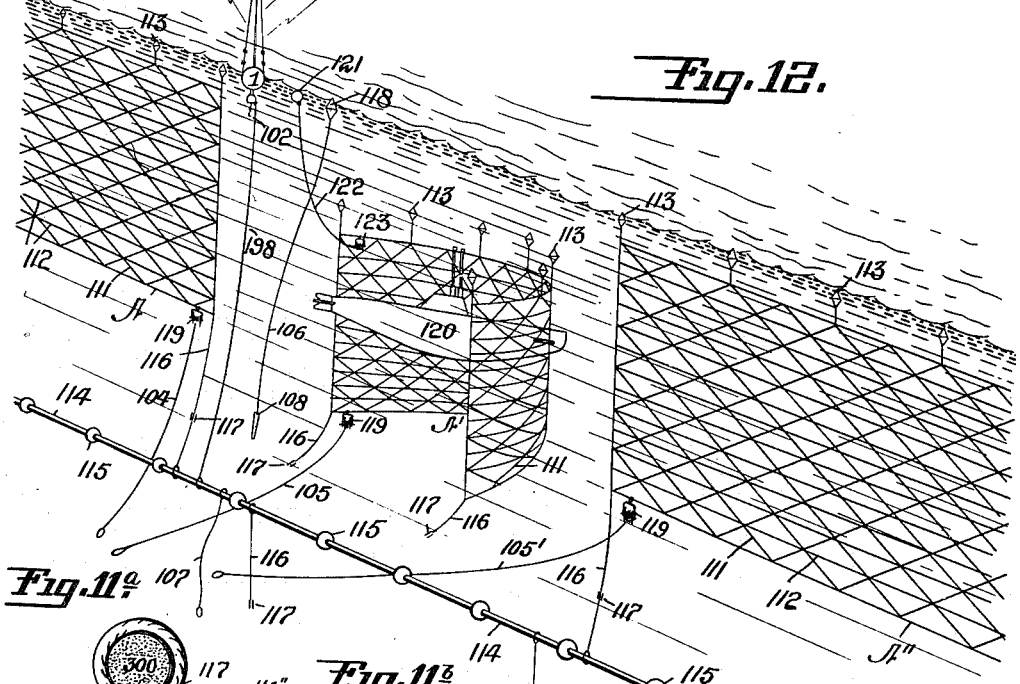
Fig. 12.
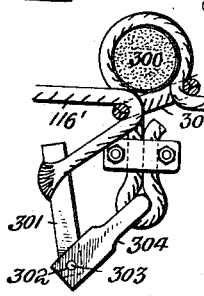
Fig. 11ᵃ.       Fig. 11ᵇ.
INVENTOR
Elmer A. Sperry
BY
Herbert H. Thompson
ATTORNEY.

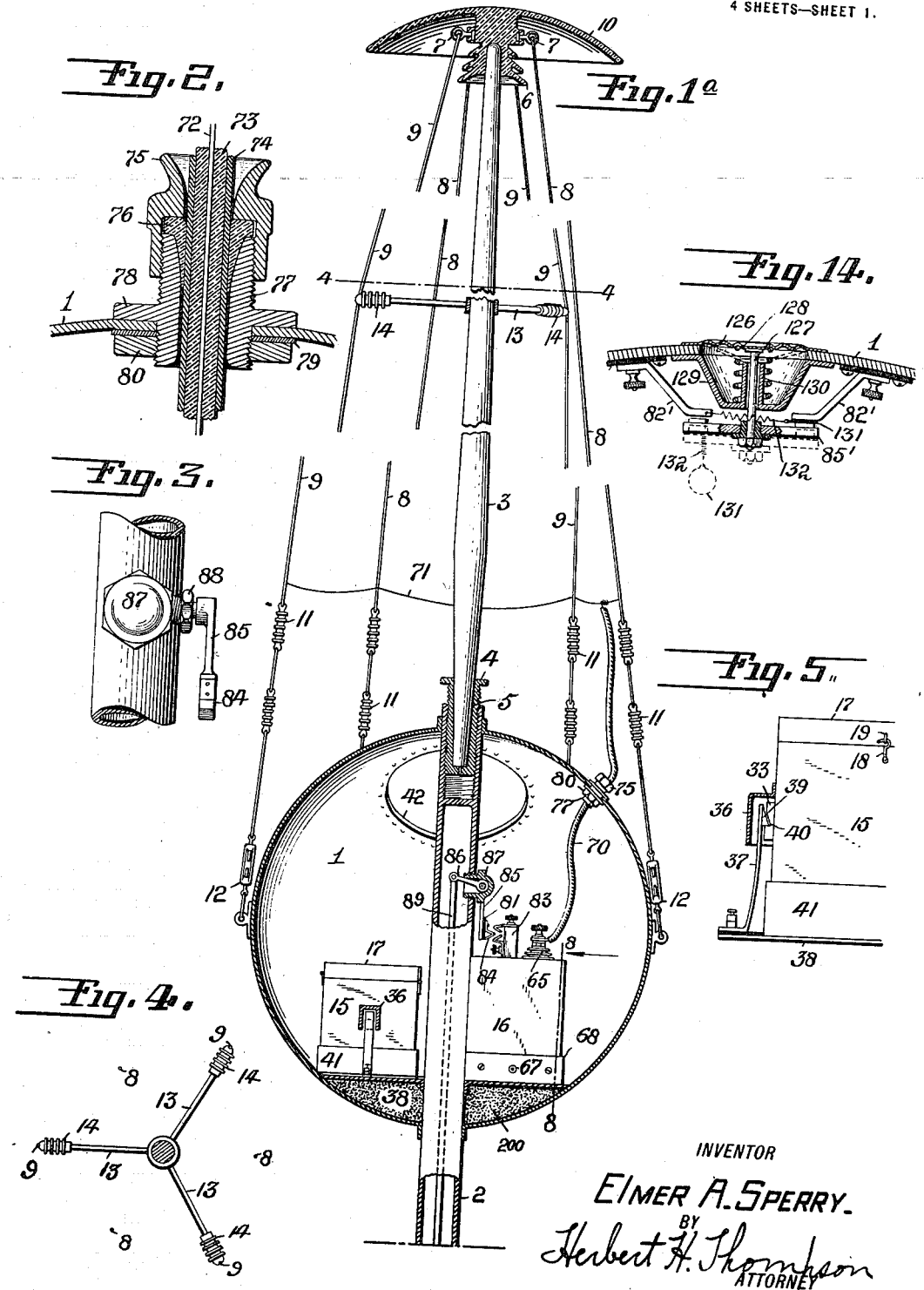

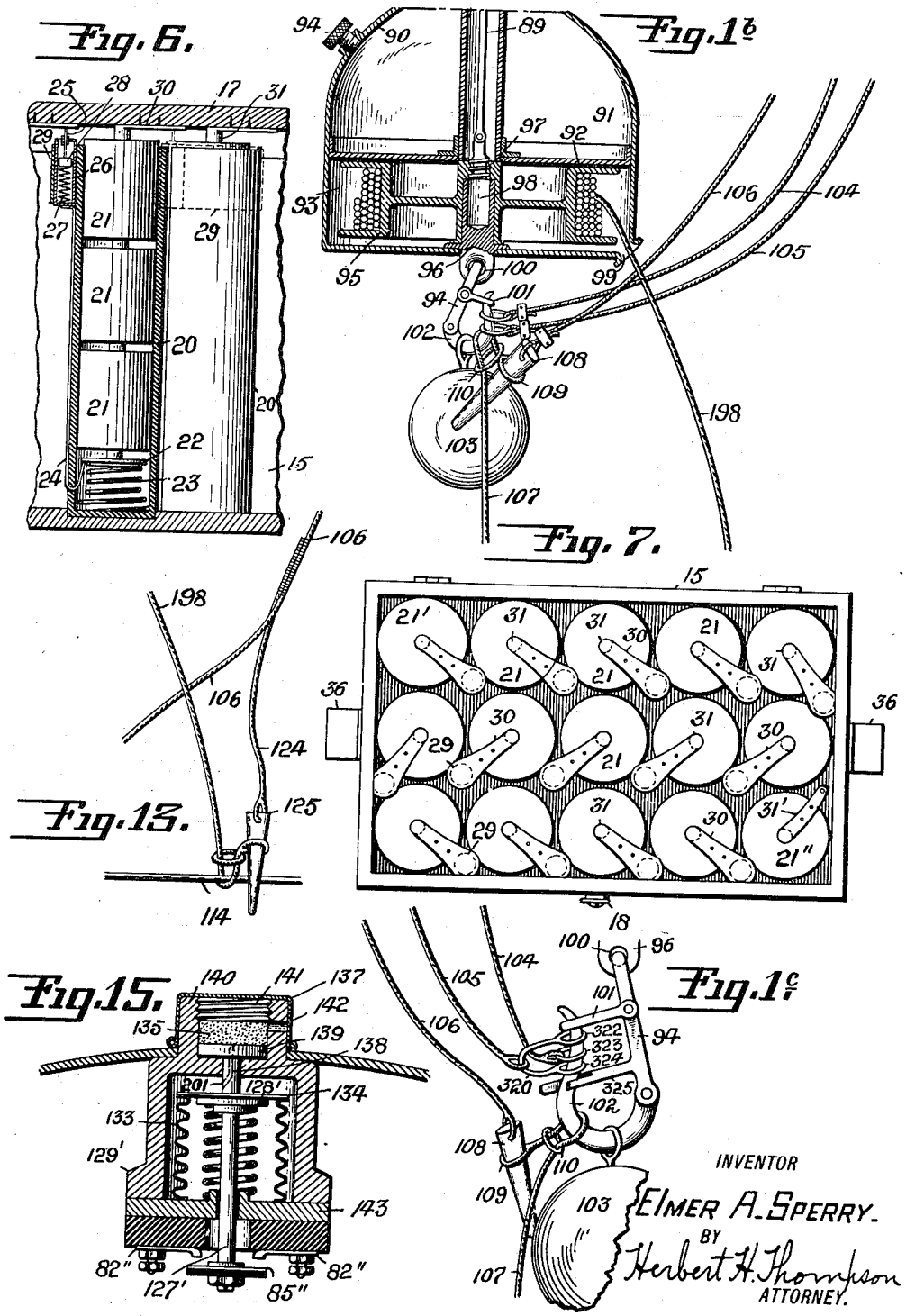

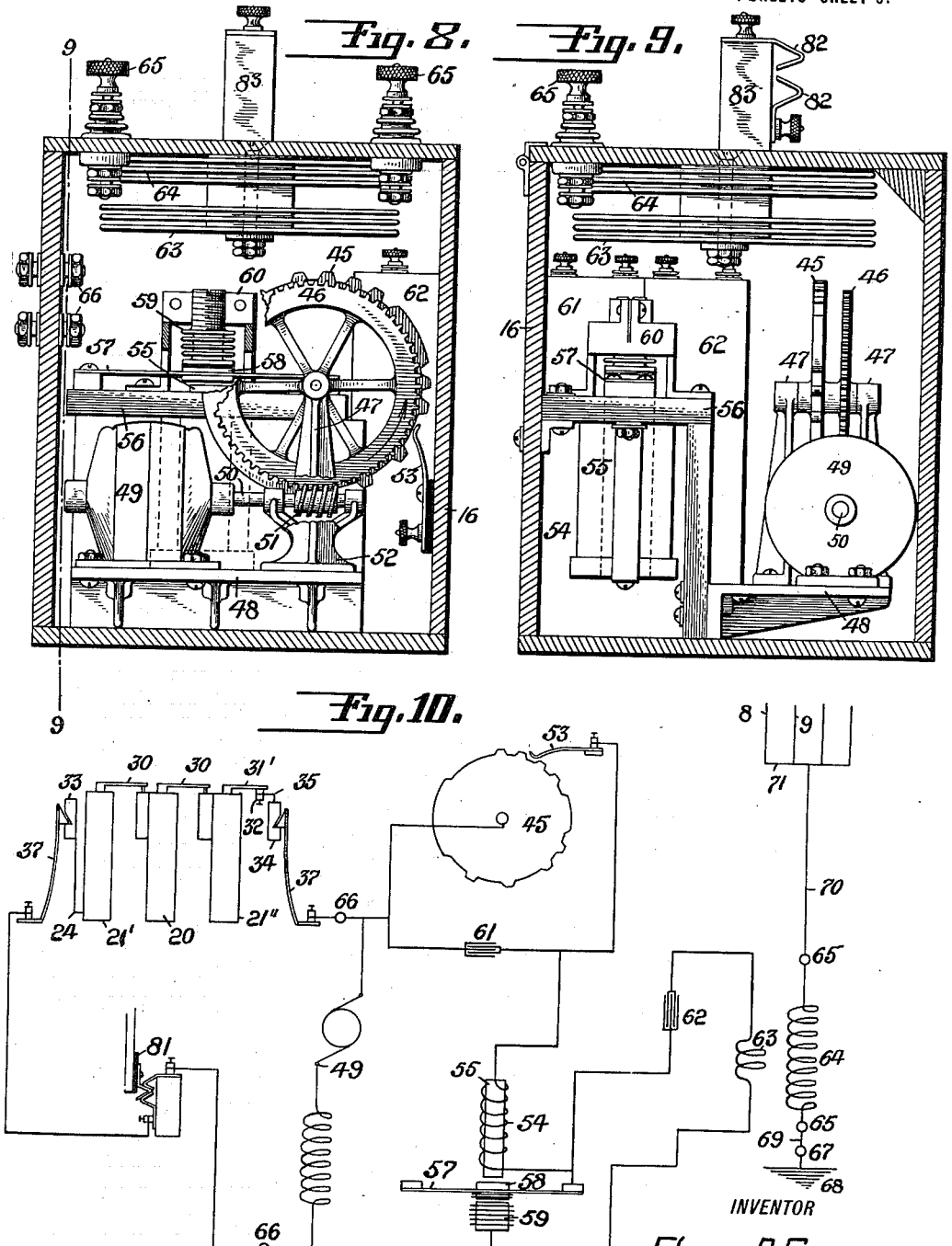

UNITED STATES PATENT OFFICE.

ELMER A. SPERRY, OF BROOKLYN, NEW YORK.

SIGNALING APPARATUS FOR DETECTING SUBMARINES.

1,426,337.  Specification of Letters Patent.  Patented Aug. 15, 1922.

Application filed July 9, 1917. Serial No. 179,586.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Signaling Apparatus for Detecting Submarines, of which the following is a specification.

My invention relates to means for detecting submarines, more particularly to that type in which a net is utilized to cause actuation of a signal.

One of the principal objects of this invention is to provide an improved type of signaling buoy employing radio signaling apparatus.

A further object is to provide an improved form of releasing mechanism for such buoys.

A still further object is to provide improved means for controlling the electric circuit of the signaling buoys.

A still further object is to provide an improved form of submarine net.

Further objects and advantages will become apparent as the invention is hereinafter described.

Referring to the drawings which illustrate what I now consider the preferred forms of my invention:

Fig. 1ª is a sectional elevation of the upper part of my improved signaling buoy.

Fig. 1ᵇ is a similar view of the bottom part thereof.

Fig. 1ᶜ is a detail of a modification of the mechanism shown at the lower end of Fig. 1ᵇ.

Fig. 2 is a sectional detail of an adjustable packing joint used in connection with my buoy.

Fig. 3 is a detail of a part of a motor-switch operating mechanism forming a part of the signal buoy.

Fig. 4 is a section taken on the line 4—4 of Fig. 1ª.

Fig. 5 is a fragmentary detail of a battery holding and connecting means.

Fig. 6 is a fragmentary sectional detail of the battery casing.

Fig. 7 is a plan view of the battery casing with the cover removed.

Fig. 8 is a sectional detail taken on the line 8—8 of Fig. 1ª.

Fig. 9 is a section taken on the line 9—9 of Fig. 8.

Fig. 10 is a wiring diagram of the buoy-contained signal mechanism.

Fig. 11 is an elevation of a complete system in normal, submerged position.

Figs. 11ª and 11ᵇ are enlarged sectional details of the shearing pins employed in the net anchor cables.

Fig. 12 is a perspective illustrating the position of the parts when a submarine hits one of the nets.

Fig. 13 is a detail illustrating a slightly modified way of securing the buoy anchoring cable to the main anchor cable.

Fig. 14 illustrates a modified form of switch operating mechanism.

Fig. 15 illustrates a further modification thereof.

Viewed broadly, my system comprises a net, or plurality of submerged nets, a normally submerged signal buoy, a connection between the former and latter to allow the buoy to rise when a net is struck by a submarine and means for setting the signal mechanism in operation when the buoy rises.

Proceeding first with the description of the buoy, attention is directed to Figs. 1ª and 1ᵇ. This buoy comprises a watertight body portion 1 adapted to support a mast. Preferably the latter is made in sections and is extensible. Such a mast is illustrated in Fig. 1ª as made up of a hollow metal sleeve 2 passing through the body portion 1 and carrying at its upper portion a pole 3. The latter is preferably made of wood and tapers at its ends away from the center. For a purpose hereinafter disclosed I prefer to provide means for adjusting the total length of the mast 2, 3. This means may assume the form of a sleeve 4 screw-threadedly engaged in the upper part of sleeve 2 and provided with an outwardly flaring central opening 5 forming a seat for the lower end of the mast section 3. Secured adjacent the top of the mast is a high-tension insulator 6 provided with a plurality of anchoring means, such as eyes 7, 7 and carrying also a hood 10. A plurality of aerial wires 8, 9 are provided and each secured at one end to a corresponding eye 7. The lower ends of the wires 8, 9 may be secured to the body portion 1 by means of lugs or other securing means. Suitable strain insulators 11 are provided in each wire 8, 9 to insulate the main, upper portion of the same from the body of the buoy and turnbuckles 12 may also be interposed in each of said wires for the purpose of individual adjustment.

The portion of the mast extending above the body portion 1 may be made more rigid and stiff by employing a spreader 13 shown as consisting of three arms and placed intermediate the ends of the mast section 3. Each of the arms of the spreader 13 is provided at its outer end with an insulator 14 over which a wire 9 is passed. The alternate wires 8 are placed between the arms of said spreader 13.

By virtue of the arrangement above described it is obvious that each of the wires 8, 9 may be so adjusted by means of turnbuckles 12 that they are all of the same length and by turning the sleeve 4 the top of the aerial may be adjusted toward or away from the mast, thus providing a means for tightening all of the aerial wires simultaneously. The hood 10 will spread any sea-weed or other entanglements above the buoy when the latter rises through the water.

I provide means for generating electrical oscillations to energize the aerial, within the body portion 1. This means comprises a battery in a casing 15 and the wireless mechanism proper in a casing 16. The above mentioned means, comprising the battery and mechanism is preferably so placed in the buoy that its center of gravity is below the center of buoyancy of the whole buoy thus aiding in maintaining the latter in its position of equilibrium with the mast uppermost.

While many forms of battery might be employed I prefer to employ one consisting of a number of small dry cells of the type employed in "flash-lights." These cells are especially adapted for use in my buoy as they are of small volume and weight so that a large number may be employed and thus a comparatively high voltage obtained. I have provided a casing or container 15 for these cells into which they may be inserted and no further act on the part of the operator is required to connect the cells to each other.

Referring to Figs. 6 and 7 it will be seen that the casing 15 is provided with a lid or cover 17 which cover is adapted to be locked in closed position by any suitable means such as a hook 18 carried by the casing and an eye 19 carried by the lid thereof. The casing 15 is also provided with a plurality of cell containers each shown in the form of a tube or cylinder 20 of fibre or other insulating material. Each of these tubes 20 is made of such a length as to take the desired number of "flashlight" cells 21, the number selected being three in the present instance. A conducting plate or terminal 22 is provided at the bottom of each cylinder 20 and is pressed upwardly by a spring 23. Each of the containers, except one of the end ones, is provided adjacent the top with a resilient contact pin or terminal 25. This pin may be resiliently supported in a metallic cylinder 26 by means of a spring 27 engaging the bottom of the cylinder and a head 28 provided on the pin. Each of the cylinders 26 is secured to its corresponding container 20 by any suitable means such as a band of insulating material 29 wrapped around the cylinder 26 and its container. The plate 22 of each container 20 is connected electrically by means of a conductor 24 to the cylinder 26 of the same container. In order to save the time usually consumed in connecting the cells in series with each other by means of wires, binding posts, etc., I provide conductors 30 on the lid 17 of the casing 15 to perform this function automatically. Each of these conductors 30 comprises a flat base portion and a raised lug 31 and each conductor 30 is so secured to the lid 17 that when the latter is closed a lug 31 will engage the outer casing (usually the zinc) of the top cell 21 of each container 20 while the other end of conductor 30 will engage the pin 28 of the next container. One of the conductors 31', instead of engaging a pin 28, is provided with a binding post, or other conductor attaching means, 32 (see Fig. 10) to form the terminal of the end cell 21" and consequently one terminal of the entire battery of cells. The other end cell 21' is not provided with a pin 25 but the conductor 24 thereof is connected directly to a terminal block 33 (see Fig. 10). The binding post 32 may be connected by means of a flexible conductor 35 to another terminal block 34. The terminal blocks 33, 34 are each secured to opposite ends of the casing 15 on the exterior thereof (see Fig. 5) and a cover plate 36 preferably of insulating material may be provided for each terminal block. These cover plates 36 serve not only to protect the terminals 33, 34 against mechanical injury but to prevent any possibility of short circuit when the battery is being transported. The members 33, 34 may also serve as handles.

From the preceding description it will be obvious that the process of filling and renewing or refilling the battery is extremely simple and practically fool-proof. Let us assume that the battery casing 15 is empty and it is desired to fill it. Each container 20 is filled with cells 21 and the only precaution that need be observed is that all of the cells be placed upright or all inverted. Preferably all of cells are placed in an inverted position, as shown, as the zinc cell-bottoms present a large area of contact to the lugs 31. The lid 17 is then closed and locked or latched and all of the cells 21 are then connected in series, the terminals being blocks 33, 34. By virtue of the springs 23 and 27 and the fact that the lid 17 is hinged to the casing 15 firm, clean contacts are made. To empty the battery, it is only necessary to open the lid and invert the casing 15 when the same may be filled with fresh batteries.

While not essential, I prefer to employ means whereby the battery is automatically electrically connected to its circuit as it is placed into position in the body portion 1 of the buoy. This means may assume the form illustrated in Figs. 5 and 10 in which spring contacts 37 are mounted on the base or shelf 38 of the buoy but insulated therefrom. These contacts are so located as to engage the blocks 33, 34 when the battery is placed in position. Preferably each contact 37 is provided with a head 39 to engage a notch 40 provided in the blocks 33, 34 to aid in holding the battery in position. A box-shaped member 41 may be secured to the shelf 38 to serve as a guide for inserting the battery and to prevent lateral displacement of the latter.

With the structure above described the battery 15 may be readily and with great facility removed or inserted into the body portion 1. Thus suppose it is desired to place the battery in position in the buoy. The hand-hole 42, provided in the body portion 1, is opened, the battery 15 is passed therethrough and lowered into position when the contacts 37 will snap into engagement with blocks 33, 34. No connecting up of leads to terminals is required. To remove the battery, the handle 36 may be grasped, the contacts 37 pulled outwardly and the battery raised.

The wireless mechanism proper, as previously mentioned is contained in the casing 16. While various types of mechanism might be found suitable, I prefer to use the apparatus illustrated. This apparatus comprises an automatic code sending key, means for driving the same, an electro-magnetic make and break device, capacity and an oscillation transformer.

Referring to Figs. 8 and 9 the sending key is shown in the form of a code wheel 45 rigidly secured to a worm wheel 46 and rotatable therewith in journal brackets 47 secured to a base bracket 48. This wheel 45 is provided with a predetermined arrangement of short and long teeth so as to send a certain signal by contacting with a contact 53 provided on but insulated from casing 16.

The means for driving the code wheel 45 may assume the form of an electric motor 49 mounted on the base bracket 48 and having a worm 51 mounted on the motor shaft 50 and meshing with the worm gear 46. A journal bracket 52 may be provided for the free end of the motor shaft, this bracket being also mounted on the base bracket 48.

The electro-magnetic make and break device is shown in Figs. 8 and 9 as consisting of a solenoid 54 provided with an iron core 55 and carried by a frame 56 secured to the casing 16. A spring diaphragm plate 57 is also secured, at its opposite ends, to the frame 56 in such a position that the iron armature 58 carried by said diaphragm lies directly over the upper end of the core 55. The armature 58 forms a vibrating contact and should therefore be faced with some suitable arc resisting material such as silver. A contact which I term a fixed contact 59 is adjustably mounted in a flanged cup-shaped member 60 secured to the frame 56 in such a position that the contact 59 lies directly above the contact 58 and is normally engaged thereby. The contact 59 should also preferably be faced with arc resisting material such as silver. The contacts 58 and 59 form the spark gap and either or both of these contacts may be provided with cooling fins as shown in Figs. 8, 9 and 10 to dissipate the heat of the arc.

The capacity is shown in the form of two condensers 61 and 62 mounted in one corner of the casing 16.

While a direct-coupled set might be utilized I prefer at this time to use an indirectly-coupled one, as illustrated. The oscillation transformer, therefore, consists of a primary 63 and a secondary 64 which are shown mounted adjacent the top of the casing 16 and suitably insulated from each other and the remaining parts. Suitable terminals such as heavily insulated terminals 65, may be provided for the high tension side of the electrical apparatus contained in the casing 16 while ordinary terminals 66 may be provided for the low tension side thereof.

The diagram of connections of the mechanism within the casing 16 is shown in Fig. 10 between the terminals 66 and 65. The motor 49 is shown connected across terminals 66, the electro-magnetic make and break device in series with the key 45 is also connected across the terminals 66, and one of the condensers 61 is shown shunted across the key contacts. The primary circuit of the oscillation transformer comprises, besides the primary winding 63, a capacity 62 and is connected across the gap 58, 59. The secondary 64 of the oscillation transformer may be connected to the terminals 65.

It will be apparent, upon inspection of Fig. 10 that one of the terminals 65 is connected to the ground and the other to the aerial 8, 9. The ground connection may be conveniently made by connecting one of the said terminals 65 to a terminal 67, provided on the metallic frame 68, by means of a wire 69. As the frame 68 is secured to and in contact with the metallic shell of the body portion 1 a very effective ground connection is thus made.

The connection 70 to the aerial, which is the only conductor which passes through the shell of the body portion 1 is connected at one end to the other terminal 65, and at its opposite end to a wire 71 electrically connected to all of the wires 8, 9 adjacent the tops of the uppermost insulators 11. The conductor 70 may be any type of high-tension insulated conductor but preferably I employ one comprising a flexible wire 72 (see Fig. 2) surrounded by a layer or sheath 73 of para rubber or other comparatively soft insulating material which, in turn, is surrounded by a fibrous fabric 74 rendered non-hydroscopic.

In order to insulate the connection 70, from the body portion 1 and at the same time render the point of egress watertight I provide what I term an insulated packet joint which may assume the form shown in detail in Fig. 2. A sleeve 77, externally screw-threaded at both ends, is provided with an intermediate flange 78 and the bore thereof is flared at the outer end. The inner end of said sleeve 77 is adapted to receive a nut 80 whereby the body-portion 1 may be gripped between the flange 78 and said nut 80. A packing washer 79 may be provided in order to render the joint between the sleeve 77 and the body portion 1 absolutely watertight. An internally threaded cap 75 with a central opening in its top is also provided. A conical shaped internally recessed plug 76 of para rubber or other waterproof, and preferably insulating, material forms the remaining element of the joint. In assembling, the sleeve 77 may be secured to the body portion 1 by inserting it, placing the washer 79 and screwing on the nut 80. The service connection 70 may be passed through the last mentioned sleeve, the plug 76 inserted and the cap 75 screwed on. By screwing the last mentioned cap on, the plug 76 is compressed down into the flaring opening of the sleeve 77 thus forming a watertight insulating joint and one in which there is no danger of abrasion of the insulating coating 74 as the latter is not in contact with any sharp corner at any point since the lower portion of sleeve 77 is rounded off and the upper part of cap 75 is outwardly flaring in construction.

Returning to the diagram in Fig. 10, it will be seen that the battery, between contacts 37, is connected in series with a switch 81 and across the terminals 66. This switch may assume various forms, one form being illustrated in each of Figs. 1ª 3, 8 and 9. In these figures the switch is shown as comprising two spaced contacts 82 mounted on a block 83 of insulating material, which may be mounted on the casing 16, and a bridging contact 84 carried by one arm 85 of a rocker arm lever. The last mentioned lever is pivoted in a plug 87 screwed into the section 2, a stuffing box or gland 88 (see Fig. 3) being provided to avoid any possibility of water creeping into the body portion 1. The outer arm 86 of the rocker arm lever, above mentioned, extends into the interior of sleeve 2 and is pivotally connected at its free end to an operating member shown in the form of a rod 89. Obviously, if the rod 89 is pulled downwardly (see Fig. 1) the switch 81 will be closed as indicated in Fig. 10.

As indicated in Fig. 1ᵇ the sleeve 2 of the buoy may carry at its lower extremity a casing 90 and a hook 94. The casing 90 is shown as comprising two compartments 91 and 93 separated by a partition 92. The upper compartment may be loaded with shot if desirable, so that the weight of the buoy may be adjusted, a removable plug 94 being provided to allow the introduction of said shot. The lower compartment 93 contains the mechanism for actuating the rod 89 and thereby switch 81.

The last mentioned mechanism is shown as comprising a reel 95 journaled on a stub shaft 96 secured in and extending through the bottom of the casing 90. The reel 95 is prevented from moving in an upward direction by engagement between its hub and the lower end of the sleeve 2 and is internally screw-threaded at the upper portion of its hub to cooperate with a screw 97. The last mentioned element is pivotally connected at its upper end to the lower end of the rod 89 and is adapted to be moved downwardly by rotation of the reel 95 in the proper direction, a recess 98 being provided in the stub-shaft 96 to permit this downward movement. A cord or cable 198 is wound around the reel and passed through an opening 99 provided in the casing 90 for the purpose of rotating the reel and I have found that the cable or cord 198 is least apt to snarl or tangle if it is so wound that at least the first layer will unwind in a downward direction.

The hook 94, mentioned above, may be secured to an eye 100 provided on the lower extremity of the stub-shaft 96. Said hook 94 is so designed as to be capable of releasing the various devices attached thereto. One way of accomplishing this function is to provide the shank of the hook with a pivotally connected loop 101 to engage the tongue 102 which is also pivotally connected to the shank. The hook 94 is shown as carrying a weight 103 and as having attached thereto a plurality of cords or cables 104 and 105 and an anchor cord or cable 107. The functions of the weight 103 and the cables last mentioned will be hereinafter specifically set forth.

At certain times, as will appear later, it is desirable to release the cord 107 from hook 94 without releasing the loop 101. For this purpose the said cord or cable 107 may be provided at one end with a loop or eye 109 adapted to receive a pin 108 to which a cord or cable 106 is attached. The cord 107 may be secured to the hook 94 by passing the end through an eye or ring member 110 then over the tongue 102 and then back through the ring 110, the pin 108 then being passed through the loop 109. Obviously by withdrawing the pin 108 by means of cable 106 the cable 107 will be released from the tongue 102.

Calling attention to Figs. 11 and 12 it will be seen that I employ nets built up of a plurality of diagonal intersecting strands 111 and a plurality of transverse strands 112 connected to the diagonal strands at each intersection thereof. I have found that this type of net possesses marked advantages over the type of net shown in my copending application Serial No. 173,276, filed June 7, 1917. In the last mentioned net the strands were all horizontal and vertical, i. e., no diagonals were provided. It will be readily seen that a vertical section of the present net contains much more metal than a similar section of the old type of net and is therefore mechanically much stronger although requiring comparatively little more wire.

The nets of which any number may be provided are designated in Figs. 11 and 12 as N, N' and N''. Each of the nets is supported in a submerged position as by means of a plurality of buoys or floats 113 and while the nets may be anchored in various ways, I prefer to employ the means illustrated. An anchor cable 114 is provided and preferably is of such a length as to supply an anchorage for a line of nets. In deep water, i. e., when the anchor cable does not rest on the sea bottom a number of buoyant members 115 may be provided on the anchor cable 114 to support the greater portion of the weight of the latter but to leave it somewhat heavier than water. Each net is releasably connected to the anchor cable by means of cables or cords 116 each provided with a shearing pin or other separable connection 117 hereinafter described in greater detail.

The signalling buoy 1 is also, preferably, attached to the cable 114 by means of the cable 107 (see Figs. 1$^b$ and 11) which connection together with the weight 103 maintains the buoy 1 in a normally submerged position as indicated in Fig. 11. The weight 103 is of such magnitude as to counteract, largely, the buoyant effect of the buoy 1 and thereby relieves cable 114 of a great deal of the upward pull which would otherwise be produced. The weight 103 is of such value that when the connection between the buoy and anchor cable is broken the buoy will rise comparatively slowly to the surface, the case 90 being made dome shaped so as not to catch on the net in rising. The cable or cord 106 for breaking the connection 107 may be provided with a float or buoy 118 at its free end and this last mentioned buoy may be painted a different color or otherwise distinguished from the buoy 113 whereby the connection may be readily found and operated from the surface. The lower end of the reel cable 198 is suitably anchored, which may be done by connecting it to the anchor cable 114. The cables 104 and 105 are each respectively connected at the ends remote from the hook 94 to the nets N and N'. Although these ends could be directly connected to the nets N, N', I prefer to connect them by means of friction reels 119, more specifically disclosed in my companion case 173,276, hereinbefore referred to.

With the connection made as above described the parts occupy the position illustrated in Figs. 1$^b$ and 11 with the buoy 1 submerged and between nets N' and N. The operation of the structure thus far described is substantially as follows: Assuming that the parts occupy the position shown in Figs. 1$^b$ and 11, and a submarine 120 strikes one of the nets N', the latter is released from the anchor cable 114, by severance of the connections 116 at 117, and is towed along by the submarine. After a predetermined length of time, depending on the total length of cable 105, the latter pulls the loop 101 out of engagement with the tongue 102 which drops and releases the weight 103 and cables 104, 105, and 107. The buoy 1 then rises, comparatively rapidly, upward to the surface (see Fig. 12) and as the lower end of cable 198 is anchored the reel 95 will be rotated. The rotation of the reel 95 moves the screw 97 and the rod 89 in a downward direction with respect to the buoy 1 thus closing the switch 81 as shown in Fig. 10. The closing of the last mentioned switch starts the motor 49 which actuated the key 45 to energize the make and break device 54 in accordance to a predetermined code. The condenser 61 prevents excessive arcing over at the key contacts. The making and breaking of the gap 58, 59 causes high frequency oscillations to be set up in the primary circuit and consequently in the secondary or antennæ circuits 64, 65, 8, 9.

Obviously if the net N were struck the cable 104 would be pulled and the rest of the operation would be identical to that above described. Preferably a buoy 1 is provided for each pair of nets but if desirable a single buoy 1 may be employed for more than two nets. For example the buoy 1 illustrated may be controlled not only by the nets N and N' but by a third net N'' by connecting the cable 105' to the hook 94 in the same manner that cables 104 and 105 are connected thereto.

While, as previously mentioned, any suitable form of wireless sending apparatus may be employed I prefer to use the form herein illustrated and designed to operate substantially as follows:

The gap 58, 59 is normally closed so that whenever the switch 81 and key 45 are closed current flows from the battery through the inductance coil 54. This current finally reaches a value at which the coil is able to attract the armature 58. The gap 58, 59 is thus opened and an abnormally high voltage is obtained due to the inductance of the coil 54. This voltage charges the condenser 62 which then discharges across the now open gap 58, 59, giving rise to highly quenched oscillations in the circuit 62, 58, 59, 63, as in the ordinary quenched gap radio apparatus. These oscillations are then transferred electro-magnetically to the aerial circuit by means of the oscillation transformer 63, 64. The above operation repeats itself as long as switch 81 is closed or until the battery runs down.

The particular advantages of this form of apparatus is that the vibrating gap 58, 59 serves to break up the direct current into a pulsating current, thus controlling the group frequency and serving to charge the condenser 62 and also when the gap is open it takes the place of the spark gap in standard radio sets. Furthermore, due to the fact that several partial discharges occur in the condenser, at each opening of the gap, very much lower antennae potentials are used for a given amount of power.

Submarine chasers or destroyers cruising within the sending zone of the buoy 1 on picking up the code message may proceed to the location of the nets N and N'.

For the purpose of enabling the destroyer to locate the submarine a net tracing means is preferably provided. This means may assume the form illustrated in Figs. 11 and 12. A buoy or float 121, preferably distinguishable from the buoys 113 and 118, may be connected to each net by means of a cord or cable 122 wound on a reel 123, which may be similar to reels 119 and which reel is secured to the corresponding net. When a net is detached and towed by the submarine the buoy 121 will be towed along on the surface and thus the submarine may be located and destroyed in any suitable manner.

Under certain conditions, as for instance where the nets have drifted out of a useful position, it may be desirable to abandon them. Under these conditions it is desirable that the buoy or buoys 1 be saved. This may be readily accomplished by picking up the buoy 118, pulling on the cable 106 and thus breaking the connection between the anchor cable 114 and the buoy 1 as previously described. It is to be noted that in effecting the above release from the anchor cable the loop 101 is not released so that the buoy 1, together with the weight 103, rises slowly to the surface, thus saving the weight also.

If desirable means may be provided for releasing the cable 198 from the anchor rope whereby when the buoy 1 is raised for the purpose of saving it, as above indicated, the reel 95 is not rotated and hence the condition of the buoy contained apparatus is not disturbed. This means may assume the form of a cable or cord 124 (see Fig. 13) connected at one end to the cable 106 and at the other end to a pin, similar to the pin 108, cooperating with a connection between the cables 98 and 114, which connection may be similar to that between the tongue 102 and the upper end of cable 107. Obviously on pulling the cable 106 the pin 125 will be withdrawn and the connection between reel cable 198 and the anchor cable 114 broken.

The mechanism for causing the closure of the battery switch within the buoy 1, when the latter moves upward to the surface, is susceptible of various modifications. Thus, as illustrated in Figs. 14 and 15 this switch may be hydrostatically controlled in various ways.

Referring to Fig. 14, the shell of the body portion 1 may be provided with an opening covered with a diaphragm 126. On the inner side of said opening a cup-shaped member 129 may be provided and suitably secured to the shell 1. By providing the member 129 with an inturned sleeve portion 130, a guide for the plunger 127, secured at its upper end to diaphragm 126, is furnished. A comparatively strong spring 128 abutting the member 129 and the diaphragm tends to hold the latter in an outward position. As the plunger 127 will occupy different positions for different positions of the diaphragm it may be employed to control the battery switch. This may assume the form of two contacts 82' each mounted on but insulated from the body portion 1 and adapted to be bridged by a conducting strip 85' carried by but preferably insulated from the plunger 127. Preferably, some means should be provided for preventing closure of the switch before the buoy 1 is placed in the submerged position. This means may assume the form of a thin disk of insulation 131, such as ebonite or mica, normally placed between bridge piece 85' and one of the contacts 82', as indicated in Fig. 14. A comparatively light spring 132 may be secured at one end to the said disk 131 and at the other end to the opposite contact 82'.

If the last mentioned switch is employed it replaces the switch 85, 83 (see Figs. 1ª and 10) so that the latter together with all of its operating mechanism may be dispensed with. Under these conditions the operation of the switch 85', 82' is substantially as follows.

Before the buoy 1 is placed in the submerged position, as indicated in Fig. 11, the parts would occupy the position indicated in full lines in Fig. 14 in which the spring 128 tends to close the switch 85', 82' but is prevented from doing so by the disk 131. When the buoy is submerged the water pressure acting on diaphragm 126, against the spring 128, causes the parts to assume the position indicated by dotted lines, the switch being further opened and the disk 131 allowed to drop out or to be pulled out by the spring 132. Now when the buoy 1 is released and rises to the surface, the pressure on the diaphragm is reduced and the spring 128 causes the bridge piece 85' to engage both contacts 82' thus closing the battery circuit.

The hydrostatically controlled switch illustrated in Fig. 14 is susceptible to various modifications, one modification being illustrated in Fig. 15. In this form the member 129' is shown as a cup shaped member having at one end a reduced sleeve portion 140 and at the opposite end a cover plate 143, shown as supporting the contacts 82" insulated therefrom. The diaphragm is replaced by a disk 134 supported by a corrugated cylinder 133, the connections between the disk and cylinder and plate 143 and the cylinder being made watertight. The structure and action of the plunger 127' spring 128', bridge 85" and disk 134 is practically the same as that of the corresponding parts in Fig. 14. An additional plunger 138 is provided and the head 139 thereof operates in the sleeve 140. A plug 135 of rock salt or other substance soluble in water, may be placed over the head 139 and a metallic screw plug 141 may be provided to hold the rock salt in. The operation of the form of switch shown in Fig. 15 is substantially as follows:

Before the buoy 1 is submerged the parts occupy the position indicated in Fig. 15, a cap 137 being provided to prevent any rainwater or moisture from entering the opening 142 provided in the sleeve 140. When it is desired to place the buoy 1 the cap 137 is removed and the buoy launched and submerged (see Fig. 11). Water entering the opening 142 causes the substance 135 to dissolve but the pressure of the water which enters through the passage 201 on the disk 134 prevents closure of the switch 85", 82". When the buoy 1 rises to the surface the pressure on the disk 134 is relieved and the spring 128' moves the plunger 127' outwardly to close the switch.

In order to prevent undue deterioration of the batteries and other mechanism within the body portion 1, it is important that the latter be free from moisture. As has been previously stated all of the openings of the buoy 1 are made water-tight and in addition I prefer to supply each buoy 1 with some moisture absorbing material such as calcium hydroxid or the like indicated at 200.

A preferred form of separable connection 117 previously referred to, is shown in detail in Figs. 11ª and 11ᵇ. I have designated the part of the cable 116 which connects to the anchor cable 114 as 116" and the part which connects to the corresponding net as 116'. The cable 116' is secured to a member 301 having a hole 302 adjacent its end, while cable 116" is provided with a forked member 304. A shear pin 303 is driven through member 304 and through a hole in member 301.

In order to prevent the pin 303 from shearing while the nets are being launched, I may provide a ring or loop 305 adapted to be caught over the cables 116' and 116" in the manner indicated in Fig. 11ª. A pin 300 shaped as indicated in Fig. 11ᵇ may be forced through a loop in the one of the cables 116". Preferably this pin is constructed of some substance slowly soluble in sea water, such as rock salt, so that after the nets have been in the water for some time, the pin 300 will dissolve and the parts 116' and 116" of each cable 116 will be held together only by the shear pins 303. The rock salt 300 may be covered with paraffined paper 306 prior to launching the nets, which paper may be ruptured or removed before the nets are launched.

Under certain conditions, i. e., if the buoy 1 should become waterlogged, the signaling system might give a false indication. Thus suppose that the parts are in the normal position as illustrated in Fig. 11 and that the buoy 1 becomes waterlogged due to leakage and starts to sink. The cable 107 would then pull upwardly on loop 101 releasing the various parts, as previously described, and allowing the buoy 1 to rise to send a signal. To prevent this action the shank 94 may be provided with an integral forked member 325 as shown in Fig. 1ᶜ, and into which fork the tongue 102 may seat as shown. This member 325 will prevent any pull on the cable 107 from releasing the loop 101 as the cable 107 is prevented from engaging the said loop 101 by said member 325.

As previously mentioned, in connection with Figs. 1ᵇ, 11 and 12, when the net N is detached by a submarine a pull is exerted on the cable 104 in order to release loop 101.

Under certain conditions the ring of the other cable 105 may stick to the tongue 102 and thus the buoy 1 would not be free to rise rapidly. This condition may be avoided by connecting the lower cable 105 to the tongue 102 as indicated in Fig. 1ᶜ. The cable 105 is shown as connected to a U-shaped member 320 which carries at each end a ring 322, 324, adapted to slip on the tongue 102. The ring 323 of the cable 104 is placed between the rings 322, 324. Obviously a pull on either cable 104 or 105 will positively sever the connection of the other cable from the tongue.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described by invention, what I claim and desire to secure by Letters Patent is:

1. A signaling buoy comprising a body portion, means carried within said body portion for producing electrical oscillations and means for absorbing moisture within said body portion.

2. In a signaling buoy, in combination, a source of direct current, a code sending key, means connected to said source and including a hydrostatically operated switch responsive to the depth of the buoy below the surface of the water for causing actuation of said key and an oscillation generator controlled by said key and connected to said source.

3. A signaling buoy comprising a body portion, a mast secured to said body portion, wireless antennæ secured to said mast and to said body portion and means for moving said mast toward or away from said body portion.

4. In combination, a buoy, an extensible mast secured to said buoy, an insulator secured to the free end of said mast, and a plurality of wires each secured at one end to said insulator and at the other end to said buoy, said wires being insulated from said buoy.

5. In combination, a buoy, a wireless mast carried by said buoy, aerial wires each secured at one end adjacent the top of said mast and at the other ends adjacent said buoy and a spreader carried by said mast intermediate its ends.

6. In combination, a buoy, a wireless mast carried by said buoy, aerial wires each secured at one end adjacent the top of said mast and at the other ends adjacent said buoy, a spreader carried by said mast intermediate its ends, and means for adjusting the tension of said wires.

7. In combination, a buoy, signaling mechanism carried by said buoy, a switch carried by said buoy for controlling said signaling mechanism, means responsive to a drop in pressure in the medium surrounding said buoy for causing actuation of said switch and means for preventing said actuation.

8. In combination, a buoy, a switch carried by said buoy, pressure responsive means for controlling said switch and means controlled by said pressure responsive means for preventing actuation of said switch before the buoy is launched.

9. In combination, a buoy, a switch carried by said buoy, means tending to move said switch to actuated position, means for preventing actuation of said switch and pressure responsive means for rendering said preventing means ineffective.

10. In combination, a buoy, a circuit controller carried by said buoy, resilient means tending to actuate said circuit controller, means including a diaphragm opposing the action of said resilient means and means within said buoy for preventing actuation of said circuit controller.

11. In combination, a buoy having an opening therein, a flexible diaphragm completely closing said opening, a circuit controller within said buoy, means interposed between said diaphragm and circuit controller for controlling the latter and means within said buoy for preventing actuation of said circuit controller until a predetermined pressure is exerted on said diaphragm.

12. In combination, a buoy, a circuit controller in said buoy, resilient means tending to actuate said controller, means responsive to a predetermined pressure for preventing actuation of said circuit controller and means independent of the exterior pressure for preventing actuation of said controller.

13. The combination with a cable adapted to be submerged in the sea, of a signal buoy, releasable means for connecting said buoy and cable to hold the buoy under water, means for releasing said releasable means, a signaling device for said buoy, and means responsive to change in depth of said buoy for causing actuation of said device.

14. In combination, a buoy, anchoring means for holding said buoy submerged, normally inoperative signaling means carried by said buoy, means adapted to be actuated by a passing submarine boat for rendering said holding means inoperative, and means brought into action by the rising of the buoy through the water for rendering said signaling means operative.

15. In combination, a buoy, anchoring means for holding the same submerged, a normally inoperative signaling device carried by said buoy, means adapted to be actuated by a passing submarine boat for rendering said holding means inoperative, means brought into action by the rising of the buoy through the water for rendering said device operative, said last mentioned means being normally inoperative and brought into operation when the buoy is placed in the water.

In testimony whereof I have affixed my signature.

ELMER A. SPERRY.